UNITED STATES PATENT OFFICE.

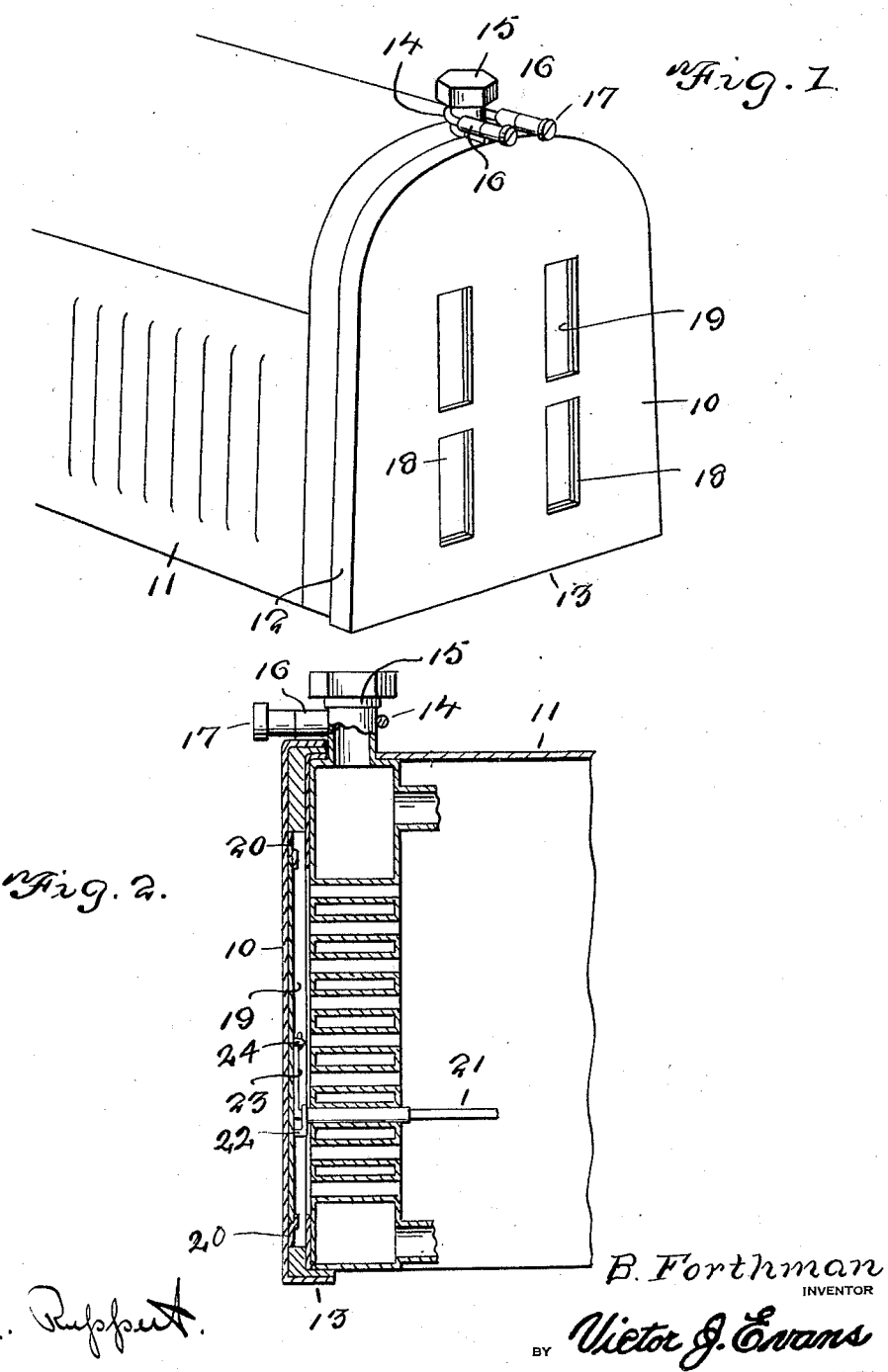

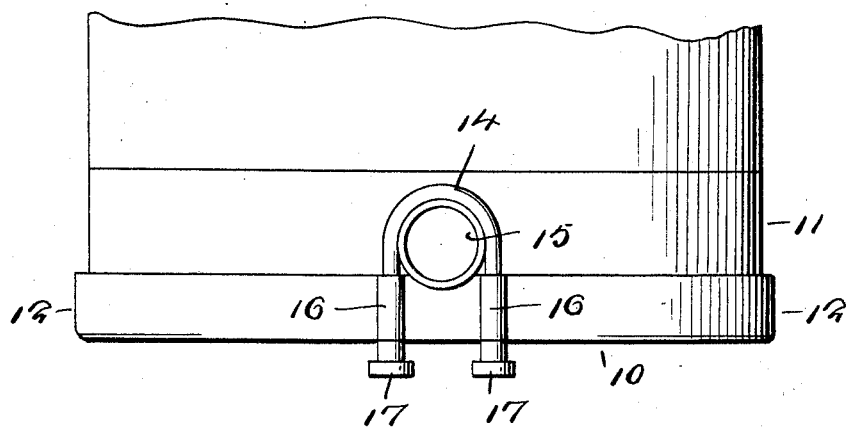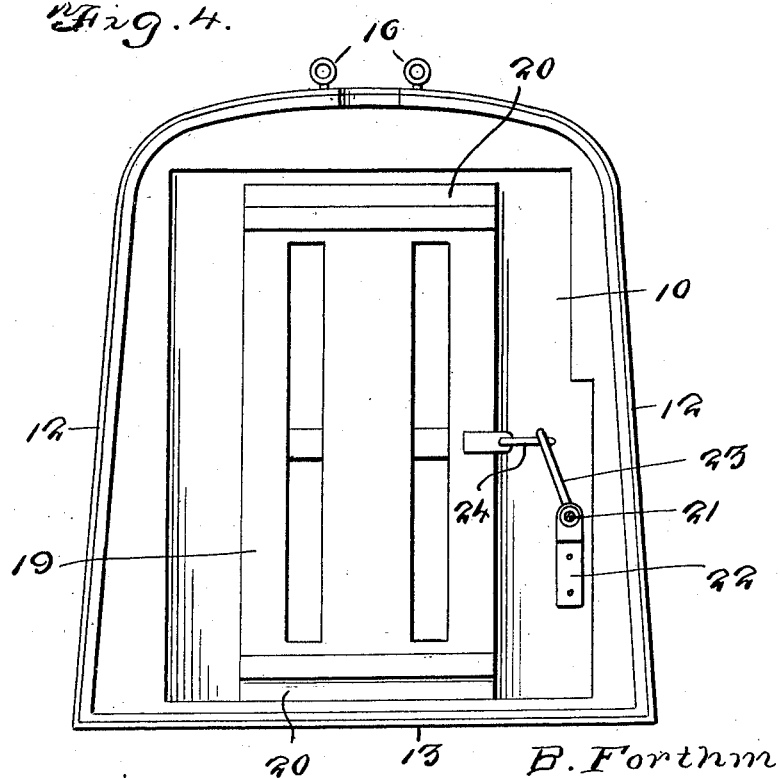

BENJAMIN FORTHMAN, OF MAPLEWOOD, MISSOURI.

RADIATOR-COVER.

1,401,064.	Specification of Letters Patent.	Patented Dec. 20, 1921.

Application filed May 10, 1920. Serial No. 380,379.

*To all whom it may concern:*

Be it known that I, BENJAMIN FORTHMAN, a citizen of the United States, residing at Maplewood, in the county of St. Louis and State of Missouri, have invented new and useful Improvements in Radiator-Covers, of which the following is a specification.

The object of the invention is to provide a relatively simple and efficient cover for the front ends of the hoods of automobiles to protect the radiator particularly in cold weather to avoid the necessity of covering the same as by a blanket or lap robe particularly when the engine is not in operation to retain the heat and prevent freezing of the water in the cooling system, and in this connection it is the object to provide a cover which may be readily applied to and removed from the radiator, and in which a circulation of air to a limited extent may be permitted through the cover, the regulation of the same being effected from the driver's seat.

With these and related objects in view the invention consists in the construction and combination of parts of which a preferred embodiment is shown in the drawings, it being understood that changes in form and proportion may be resorted to within the scope of the claims without departing from the principles involved.

In the drawings:—

Figure 1 is a perspective view of the radiator cover or protector arranged in operative relation with an automobile hood.

Fig. 2 is a sectional view of the same.

Fig. 3 is a plan view to show the means by which engagement is made with the water inlet cup or nozzle through which the radiator system is filled.

Fig. 4 is a rear or inner side view of the cover or protector.

The device consists of a plate 10 of a size and shape adapted to correspond with that of the end of the automobile hood shown at 11 and which obviously may be of any of the types now in common use, side and bottom flanges 12 and 13 being extended rearwardly from said plate so as to provide an effective joint between the cover or protector and the hood and prevent the circulation of air therethrough. At the top and extending rearwardly from the flange 12 is a loop 14 for extending around the water cup or feed nozzle 15 of the automobile hood, the arms of said loop being extended through guides 16 on the flange 12 and being fitted with nuts 17 so that a secure engagement of the loop with the cup or nozzle may be effected to insure the substantial locking of the cover or protector to the hood and prevent accidental displacement thereof by jarring during the movement of the car.

In the body portion of the plate 10 there may be formed a plurality of ventilating openings 18 which in connection with a correspondingly slotted slide 19 fitted in guides 20 on the rear or inner surface of the plate constitute a register by means of which a certain amount of air can be admitted to the radiator when desired, as for example when the car is in motion or the engine is running, while providing for the closing of said slots and therefore the exclusion of cold air when the car is standing motionless. In order that the manipulation of the register may be effected from the interior of the car or from the driver's seat, a rock shaft 21 may be mounted in a suitable bracket 22 on the rear side of the plate and extended to and through the dash board of the car within reach of the driver, a crank arm 23 being provided on said shaft for connection with the slide 19 by means of a link 24.

While additional means of securing the cover or protector in place may be provided, it will usually be found sufficient to depend upon the means above described and consisting essentially of the adjustable loop with which the arcuate side flange 12 of the same is fitted.

What is claimed is:—

1. A cover or protector for the radiator of an automobile, consisting of a flanged plate for fitting over said radiator and provided with a ventilating register and a securing means for said cover or protector consisting of a loop extending rearwardly from the upper flange of the plate for engagement with the filling cup or nozzle of the radiator, the arms of said loop being removably extended through guides, and adjusting nuts engaging the arms for tightening the loop to normally lock said protector to the radiator.

2. A cover or protector for the radiator of an automobile comprising a rearwardly flanged plate and means for securing the same in place on the radiator, and a ventilating register mechanism carried by said plate and consisting of slots in the plate, a slotted slide mounted in guides within the protector and having operative relation with the slots in the plate, a rock shaft adapted for manipulation by the driver, and having one extremity thereof journaled in a bracket mounted on the inner face of the plate and pivotal connections between said rock shaft and the slide.

In testimony whereof I affix my signature.

BENJAMIN FORTHMAN.